United States Patent [19]

Borgholm et al.

[11] Patent Number: 5,584,926
[45] Date of Patent: Dec. 17, 1996

[54] CEMENT COMPOSTION

[75] Inventors: Hans E. Borgholm, Lyngby; Jesper Damtoft, Vodskov, both of Denmark

[73] Assignee: Aalborg Portland A/S, Aalborg, Denmark

[21] Appl. No.: 318,718

[22] PCT Filed: Apr. 13, 1993

[86] PCT No.: PCT/DK93/00132

§ 371 Date: Jan. 4, 1995

§ 102(e) Date: Jan. 4, 1995

[87] PCT Pub. No.: WO93/21122

PCT Pub. Date: Oct. 28, 1993

[30] Foreign Application Priority Data

Apr. 13, 1992 [DK] Denmark .................................. 0495/92

[51] Int. Cl.⁶ .................................. C04B 7/02; C04B 7/06
[52] U.S. Cl. .................................. 106/713; 106/714; 106/715; 106/716; 106/738; 106/724; 106/734; 106/735; 106/736; 106/778; 106/787; 106/799; 106/800; 106/815; 106/816; 106/817; 106/819; 106/823
[58] Field of Search .................................. 106/713, 716, 106/724, 734, 735, 736, 737, 738, 739, 765, 768, 776, 778, 785, 787, 788, 795, 799, 800, 801, 816, 817, 819, 823, 815, 714, 715

[56] References Cited

U.S. PATENT DOCUMENTS

| | | | |
|---|---|---|---|
| 3,615,787 | 10/1971 | Teramoto et al. | |
| 3,819,389 | 6/1974 | Uchikawa et al. | 106/735 |
| 3,860,433 | 1/1975 | Ost et al. | 106/765 |
| 3,864,141 | 2/1975 | Uchikawa et al. | 106/776 |
| 4,028,126 | 6/1977 | Mori et al. | 106/765 |
| 4,042,408 | 8/1977 | Murray et al. | |
| 4,135,941 | 1/1979 | Skalny et al. | |
| 4,451,295 | 5/1984 | Sprouse | |
| 4,773,934 | 9/1988 | Colin | 106/738 |
| 4,877,452 | 10/1989 | Roussel et al. | |
| 5,079,851 | 12/1991 | Skovára et al. | 106/738 |

FOREIGN PATENT DOCUMENTS

| | | |
|---|---|---|
| 2059400 | 5/1971 | France . |
| 2615183 | 11/1988 | France . |
| 2055786 | 3/1981 | United Kingdom . |
| 2085865A | 5/1982 | United Kingdom . |

OTHER PUBLICATIONS

Barnes, "Structure & Performance of Cements", 1983 (no month) applied science publishers, England pp. 127–128, 145, 212.
International Search Report, Jul. 13, 1993.
Zement, Kalk, Gips., vol. 43, No. 4, 1990, Wiesbaden De, pp. 199–208, XP115224, J. Strunge et al. (no month).
Chemical Abstracts, vol. 113, No. 24, Dec. 10, 1990, Abstract No. 217024x & CN, 1,042,530, May 30, 1990.
Lea, F. M., "The Chemistry of Cement and Concrete", 1970, Edward Arnold LTD, London, GB, 3rd. Edition (no month).
Chemical Abstracts, vol. 99, G. K. Moir, "Improvements in the early strength properties of portland cement", & Philos. Trans. R. Soc. London, Ser. A, 310(1511), 127–38, 1983 (no month).

Primary Examiner—Mark L. Bell
Assistant Examiner—Michael Marcheschi
Attorney, Agent, or Firm—Fish & Richardson P.C.

[57] ABSTRACT

A cement composition consists essentially of (a) from 50% to 97% by weight (calculated on the total composition) of a Portland cement clinker, the sulfur content of which is from 0.5% to 10% by weight expressed as $SO_3$ and the fluorine content of which is from 0.13% to 1.00% by weight expressed as F, and (b) from 3% to 50% by weight (calculated on the total composition) of an extender containing a carbonate selected from calcium carbonate, magnesium carbonate, calcium magnesium carbonate and mixtures thereof as its main constituent and having a median particle size ($d_{50}$) of below 14 μm. Preferably, the total content of $C_3S$ and $C_2S$ in the Portland cement clinker is at least 65%. A preferred carbonate is electrostatic precipitator dust extracted from cement kiln exhaust gases. The cement composition may be mixed with further components such as other extenders, retarding agents and aggregate.

30 Claims, No Drawings

CEMENT COMPOSTION

This application is the National Phase of International Application No. PCT/DK93/00132, filed Apr. 13, 1993.

FIELD OF THE INVENTION

The present invention relates to compositions of extended hydraulic cements, that is cements which, upon mixing with water set and harden to give substantial strength, and more particularly to extended cement compositions exhibiting high strength.

BACKGROUND OF THE INVENTION

The chemical parameters LSF, S/R and A/F referred to in this specification are:

$$\text{Lime Saturation Factor } (LSF) = \frac{CaO - 0.7\, SO_3}{2.8\, SiO_2 + 1.2\, Al_2O_3 + 0.65\, Fe_2O_3}$$

$$\text{Silica Ratio } (S/R) = \frac{SiO_2}{Al_2O_3 + Fe_2O_3}$$

$$\text{Alumina Ratio } (A_F) = \frac{Al_2O_3}{Fe_2O_3}$$

$$\text{Sodium oxide equivalent } (Na_2O_{eq}) = 0.658 \cdot K_2O + Na_2O$$

In the foregoing ratios, the chemical symbols represent percentage by weight of the identified substance present in the composition. In the following description and claims the percentages referred to are by weight.

Four cement minerals are usually regarded as the major constituents of Portland cement clinker: Alite which mainly consists of tricalcium silicate ($3CaO.SiO_2$) designated $C_3S$, belite which mainly consists of dicalcium silicate ($2CaO.SiO_2$) designated $C_2S$, tricalcium aluminate ($3CaO.Al_2O_3$) designated $C_3A$, and tetracalcium aluminate ferrite ($4CaO.Al_2O_3.Fe_2O_3$) designated $C_4AF$.

Throughout this specification, the quantity of the main clinker compounds have been calculated according to the Bogue formulas, corrected for the presence of $SO_3$ in the clinker (F. M. Lea: "The Chemistry of Cement and Concrete." Edward Arnold (Publishers) Ltd., third edition London, p. 115–116). It is also possible to determine the content of $C_3S$ directly by quantitative X-ray diffraction, although it is necessary to apply a correction allowing for the increased $C_3S$ content due to the solid solution of Al, Fe, F, Mg, and other elements into the $C_3S$ in order to obtain results that can be compared with the $C_3S$ content calculated according to Bogue.

A number of minor components such as MgO, $TiO_2$, $Mn_2O_3$, $K_2O$ and $Na_2O$ are present in the clinker although they usually do not amount to more than a few percent of the cement. Two of the minor components are of particular interest: sodium oxide ($Na_2O$) and potassium oxide ($K_2O$) also known as the alkalies (although other alkali metals also exist in cement). They have been found to react with some aggregates by an expansive reaction, the so-called alkali-aggregate reaction. The products of this reaction may cause disintegration of the concrete, and necessitate costly repair or even demolition of structures.

It has been found that expansion due to alkali-aggregate reaction can be reduced or eliminated by the use of cement with low alkali content. In several countries the use of cement with high alkali content is therefore restricted by standards, recommendations and other regulations. For example, in Denmark the alkali content of cement should preferably be less than 0.8% sodium oxide equivalent to be used for ready mixed concrete and for concrete element production. For other applications, even lower alkali contents are preferred. Generally, it is desirable that the alkali content should be as low as possible.

Portland cement is typically manufactured by a process, according to which clinker is obtained by heating to partial fusion a mixture comprising limestone and a combination of various materials containing the necessary quantities of silica, alumina and iron oxide, such as sand, shale, clay or fly ash. The burning process is typically performed in a rotary kiln. The clinker is finely ground in a mill to obtain the finished Portland cement. Minor amounts of gypsum or other retarders are typically added to the mill in order to control the setting behaviour of the cement.

Cement production is a very energy-intensive process. Considerable energy is required to decompose $CaCO_3$ to CaO and $CO_2$, to heat the clinker to the required sintering temperature of typically 1450°–1550°C., and to grind the clinker to the required cement fineness. Furthermore, if wet raw materials are used, significant amounts of energy are spent evaporating the water.

Various gases, which may be undesirable from an environmental standpoint, are emitted during the production of Portland cement. The high temperatures involved results in the emission of nitrous oxides, and combustion of fuel and decomposition of limestone leads to significant release of $CO_2$.

It is both from economical and environmental points of view desirable to reduce the energy consumption. The efforts to achieve this goal in the cement industry have mainly followed two lines:

the use of mineralisers to reduce the sintering temperature the use of extenders to decrease the amount of the clinker consumed.

In cement making, the term mineraliser is used to describe substances that facilitate the sintering reactions that take place in the kiln. These substances may be added to the raw mix or may be inherent in the raw materials at certain locations. Fluxes are substances that increase the quantity of liquid phase during the sintering of the clinker, thus facilitating the formation of the clinker compounds.

Mineralisers containing fluorine such as calcium fluoride, aluminum fluoride and silicofluorides are the most studied types of mineralisers. The mineralising action may be attributed to several factors including increase of the alite formation rate, lowering of alite formation temperature and stabilization of alite crystals due to solid solution of fluoride in the alite crystals. However, it is well documented in the literature that the hydraulic activity of cements at early ages is reduced at high levels of fluoride additions.

Substances containing sulfur such as calcium sulfate and alkali metal sulfates may act as fluxes, but calcium sulfate is known to raise the temperature by which CaO and $C_2S$ is combined to form $C_3S$.

Use of a combined mineraliser containing fluorine and sulfur is described in several references. These indicate that fluorine overcomes the undesirable effect of calcium sulfate mentioned above.

Reductions of the required sintering temperature of up to 200° C. have been reported by use of the mentioned mineralisers. As heat is very effectively recovered in modern cement kilns, the potential energy savings are, however, relatively small; less than 5% for a 200° C. reduction in burning zone temperature. However, an important benefit of the decreased burning temperature is a significant reduction in the emission of nitrous oxides.

A well-known method of producing less costly hydraulic binders is to substitute a part of the Portland cements with a so-called extender. An extender is a fine grained material with a median grain size similar to or finer than the Portland cement. Typical examples of extenders are ground limestone, natural pozzolana, pulverized fly ash (PFA), and blast furnace slag (BFS).

Although the extenders may contribute to the strength development, the dilution of the Portland cement component in the extended cements generally leads to inferior early and late strength compared with pure Portland cements. The strength of extended cements may to a certain extent be increased by milling the Portland cement component to a finer grain size which, however, results in higher milling costs and limits milling capacity. The late strength may be increased by selecting particularly reactive extenders such as certain blast furnace slags or natural pozzolana. The availability of these materials are, however, limited in many geographical regions.

Combining mineralised cement, i.e. cement produced by the use of mineralisers, with an extender could be a promising way of obtaining significant reductions of energy consumption and emission of $CO_2$ and nitrous oxides.

GB 1 498 057 (U.S. Pat. No. 4,042,408) describes cements produced by the use of mineralisers containing fluorine and sulfur. The main advantage of the use of mineralisers described in GB 1 498 057 is not the decreased sintering temperature, but that the use of mineralisers enables the manufacture of cements with high alite contents and hence high early and late strength. The early strength of the cements described in GB 1 498 057 is further enhanced by a considerable alkali content of the clinker.

It is reported in GB 1 498 057 that some of these cements are useful for incorporating with a pulverised fly ash or a blast furnace slag extender, since the higher strength of the clinker in comparison with conventional Portland cement permits a larger addition of these extenders while achieving the same strength properties of the final mixture. The strength contribution of the extenders in question to the strength of the final mixture is, however, not improved by using the cement clinker described in GB 1 498 057 as base instead of conventional Portland cements. Thus, the dilution effect will tend to decrease the strengths of the extended cements based on the cements described in GB 1 498 057 in the same manner as extended cements based on conventional Portland cement. Consequently, combining the cement clinker described in GB 1 498 057 with fly ash or blast furnace slag is not the optimum method for producing inexpensive high strength cement compositions. Furthermore, the enhanced alkali content of the cements described in GB 1 498 057 limits their usefulness as base for extended cements because of the previously mentioned alkali-aggregate reaction.

For these reasons, it will be evident that an extended cement with production costs equal to or lower than conventional extended cements, but possessing early and late strength comparable to or higher than pure conventional Portland cement, would benefit numerous applications, in particular if the extended cement is of low alkali content. Very significant reductions of the clinker content of concrete might be achieved, both by the use of extended cement and y taking advantage of the high cement strength to reduce the cement content of the concrete without compromising concrete strength. Thus, significant reductions of cost, the amount of fuel needed, and the emission of nitrous oxide and $CO_2$ could be attained. A further benefit of such an extended cement would be that cement production capacity could be increased without the need for investment in costly equipment because a substantial amount of clinker could be substituted by an extender while the cement maintained the strength properties of a conventional Portland cement.

From the above it can be seen that there is a substantial need for art extended cement, in particular one whose clinker portion has a low alkali content, which on the one hand may be produced at reduced costs and with reduced emissions of $CO_2$ and nitrous oxides but on the other hand has high early and late strength and may make it possible to increase production capacity without the need for costly investments.

SUMMARY OF THE INVENTION

It has been found that the above needs can be substantially fulfilled by an extended cement composition, said composition consisting essentially of a) from 50% to 97% by weight (calculated on the total composition) of a Portland cement clinker, the sulfur content of which is in the range of 0.5–10% by weight expressed as $SO_3$, and the fluorine content of which is in the range of 0.13–1.00% by weight expressed as $F^-$; and b) from 3% to 50% by weight (calculated on the total composition) of an extender containing a carbonate selected from calcium carbonate, magnesium carbonate and calcium magnesium carbonate, and mixtures thereof, as its main constituent and having a median particle size ($d_{50}$) of below 14 μm.

Ground limestone has found a certain application as extender for extended cements because of its low price and wide availability. It has also been observed that finely divided calcium carbonate may, in a limited way, contribute to the early strength development of extended cements when used together with conventional Portland cement clinker. This has been ascribed to the carbonate-containing extender perhaps acting as a fine filler filling out the voids between the larger particles or the material perhaps accelerating the hydration rate of the cement. However, finely divided calcium carbonate is generally regarded as a basically inert filler when used in extended cements. The early and late strengths of conventional Portland cement extended with ground limestone are consequently limited.

It has now surprisingly been found that the fine carbonate-containing extender described above under b) provides a far larger contribution to the strength development of extended cements based on the mineralised Portland cement clinker described under a) than to similar extended cements based on conventional Portland cement clinker. The enhanced strength contribution is at its maximum after 1 day but for some clinker composition is still very significant after 28 days.

By using the high strength potential of the Portland cement clinker described under a) in combination with the above described enhanced strength-contributing effect of the fine carbonate extender to said Portland cement clinker, surprisingly high strengths may be obtained by adding as much as up to 50% of the fine carbonate extender to the clinker. Preferred embodiments of the cement composition of the invention provide 1 and 28 day strengths which are similar or superior to comparable conventional Portland cements.

DETAILED DESCRIPTION OF THE INVENTION

In the cement composition of the invention, it has been found that the effect of the extender on the final strength of the hydrated composition increases with decreasing particle size of the extender. Consequently, it is preferred that the median particle size ($d_{50}$) of the extender is below 12 µm, preferably below 10 µm, more preferably below 6 µm, in particular below 4 µm, especially below 3 µm.

The extender may in principle be selected from any type of rocks, mineral or synthetic compound or material containing calcium carbonate, magnesium carbonate or calcium magnesium carbonate, or mixtures thereof. Examples which, however, are not in any way to be construed as exhaustive, include calcite, aragonite, dolomite, limestone, dolostone, dolomitic limestone, travertine, calcarenite, coquina, chalk, marble, as well as industrial products, by-products or wastes containing such materials. The choice of the extender source may be affected by local availability.

One material which has been found to be very useful is carbonate-containing electrostatic precipitator dust resulting from flue gas cleaning in various industrial processes, in particular electrostatic precipitator dust extracted from cement kiln exhaust gases after the gases have passed through a drier/crusher and a de-dusting cyclone, such materials typically consisting of finely divided chalk with minor amounts of fly ash and fine-grained sand.

As indicated above, calcium carbonate, magnesium carbonate or calcium magnesium carbonate as well as mixtures thereof should be the main constituent of the extender. In the present context, the term "main constituent" is intended to mean that the carbonate(s) in question are present in an amount higher than any other single constituent in the extender. However, for the purposes of the present invention, it is considered advantageous if the content of calcium carbonate, magnesium carbonate, calcium magnesium carbonate or mixtures thereof in the extender is at least 50%, preferably at least 60%, more preferably at least 70%, in particular at least 75%, more particularly at least 80% by weight, especially at least 85% by weight, such as at least 95% by weight, calculated on the extender. The above discussed cement kiln electrostatic precipitator dust may typically (although dependent on the design and operation of the kiln) contain approximately 85% by weight of calcium carbonate, approx. 10% by weight of fly ash, and approx. 5% by weight of fine sand.

With respect to the amount of the mineralised Portland cement clinker and extender in the composition of the invention and to achieve an optimum between strength and extender content, a preferred embodiment contains 60–95% by weight of cement clinker and 5–40% by weight of the extender, in particular 65–95% by weight of cement clinker and 5–35% by weight of the extender, especially 70–90% by weight of cement clinker and 10–30% by weight of the extender.

The mineralised Portland cement clinker used in the composition of the invention preferably has a total content of $C_3S$ and $C_2S$ of at least 65%, more preferably at least 70%, in particular at least 75%, especially at least 80%, calculated according to Bogue and corrected for the content of calcium sulfate in the clinker.

In the composition of the invention, it is for reasons of ease of control of the clinker kiln preferred that the Portland cement clinker in the composition has a sulfur content in the range of 1.3–10% by weight expressed as $SO_3$, and a fluorine content in the range of 0.13–0.55% by weight expressed as $F^-$; the sulfur content expressed as $SO_3$ is advantageously in the range of 1.5–6% by weight, preferably 1.6–5%, in particular 1.8–4%, and the content of fluorine expressed as $F^-$ is advantageously in the range of 0.15–0.45% by weight, preferably 0.15–0.35%, in particular 0.18–0.30%.

In order to limit the above described alkali/aggregate reactions, it is preferable if the alkali metal content of the clinker expressed as $Na_2O$ equivalent is in the range of 0.1–0.8% by weight, preferably 0.2–0.7% by weight, more preferably 0.3–0.6% by weight.

In order to improve the strength of the composition containing the cement clinker used in the composition of the invention, it is advantageous if the $C_3S$ is of improved hydraulic activity, i.e. present in the crystal modification characterized by the presence in the X-ray diffractogram of only one peak in the region 51°–52° 2Θ corresponding to the 220 reflection of the hexagonal subcell. In the present context, the term "improved hydraulic activity" is intended to mean that the hydraulic activity of the $C_3S$ is enhanced relative to $C_3S$ in conventional Portland cements.

Also, in order to increase the content of $C_3S$ in the cement clinker for the purpose of increasing the early strength of the composition, it is preferred that the fluorine in the Portland cement clinker is predominantly present in solid solution in the silicate crystal phases. In particular, it is preferred that at least 85% of the fluorine is present in solid solution in the silicate crystal phases of the clinker. For the same reasons, it is also advantageous if some aluminium is incorporated in solid solution in the silicate crystal phases, preferably that the silicate crystal phases contain more than 0.6% by weight of aluminium, calculated as $Al_2O_3$, in particular more than 1.0%, especially more than 1.4%.

Since the lime saturation factor (LSF) of the Portland cement clinker us ed in the composition of the invention, when corrected for the content of calcium sulfate, is of significance for the content of $C_3S$ in a cement clinker during the production thereof, it is preferred that the LSF is at least 0.95, preferably at least 0.97, in particular at least 0.99.

It is further normally useful that the silica ratio of the mineralised Portland cement clinker is in the range of 2–30, preferably 2–20, more preferably 3–20, in particular 4–20, especially 5–20, such as 5–15. However, it has surprisingly turned out that although compositions of the invention, the cement clinker of which have a high (e.g. above 6.5) silica ratio, generally exhibit a higher 1-day strength than similar compositions whose cement clinker portion has a relatively low (e.g. 2.3–2.8) silica ratio, compositions with low-silica ratio clinker have been shown to result in 28-day strengths comparable to those containing high-silica ratio clinker. Thus, the strength contribution of the fine carbonate-containing extender after 28 days is larger to the low-S.R. clinker than to the high-S.R. clinker, cf. the examples. Consequently, the choice of silica ratio in the cement clinker portion of the composition of the invention should be selected in view of these relationships.

It is also preferred that the sulfur/fluorine ratio expressed as $SO_3/F$ in the Portland cement clinker is at least 6.6, preferably at least 7, in particular at least 8.

As mentioned previously, the composition of the Portland cement clinker in the composition of the present invention preferably exhibits a fairly high total content of $C_3S$ and $C_2S$. However, it is further preferred that the content of $C_3S$ in the clinker is at least 60%, more preferably at least 65%, in particular at least 70%, especially at least 75% by weight. These percentages are the contents determined based on the elemental composition of the cement according to Bogue.

In view of the desired silica ratios described above as well as the desire to incorporate aluminium into the alite crystals as a solid solution, it is advantageous that the content of $Al_2O_3$ in the Portland cement clinker of the invention is less than 6% by weight, preferably less than 5%, in particular less than 4%, but preferably larger than 0.5%, in particular larger than 1%. Also, it is preferable that the content of free lime is less than 3%, in particular less than 2% by weight in order to maximise the content of $C_3S$.

It is further preferred that the content in the clinker of calcium sulfate as dead-burned anhydrite is at least 0.1%, preferably at least 0.5%, more preferably at least 1%, in particular at least 2% by weight. However, in order to maintain the best possible set-regulating effects of the calcium sulfate included in the raw material, it is preferred that the content of calcium langbeinite is in the range of 0.1–8.3%, in particular 0.1–4% by weight of the clinker.

Since the compressive strength obtainable by hydrating a cement clinker is in part a result of the specific surface area of the ground cement clinker in that an increase in the specific surface area results in an increase of the strength development rate, it is preferred that the Portland cement clinker in the composition according to the invention has been ground to a specific surface area according to Blaine of 150–1000 $m^2/kg$, preferably 200–900 $m^2/kg$.

The composition of the invention may advantageously further contain a retarding agent which may be any of the well-known retarding agents used in cements and cement compositions, such as calcium sulfate or hydrates thereof.

In order to keep the alkali metal content low in the composition of the invention, it is preferred that the carbonate-containing extender has an alkali metal content of below 0.8% by weight expressed as $Na_2O$ equivalent.

It is preferred that the cement composition of the invention is composed so that when the clinker is ground to a specific surface area according to Blaine of 400 $m^2/kg$, the composition provides a 1-day compressive strength, when measured according to EN-196-1, of at least 21 MPa, more preferably at least 24 MPa, in particular at least 26 MPa, especially at least 28 MPa, such as 30 MPa. Likewise, it is preferred that it provides a 28-day compressive strength, when measured according to EN-196-1, of at least 55 MPa, more preferably at least 60 MPa, in particular at least 65 MPa.

The clinker used in the composition of the invention may be obtained commercially or may be manufactured by a classical process comprising heating to partial fusion a mixture comprising principally lime and silica together with a smaller proportion of alumina and iron oxide in the presence of mineralisers comprising sulfur and fluorine under such conditions that the clinker will retain sulfate in an amount of 0.5–10% by weight expressed as $SO_3$, and fluoride in an amount of 0.13–1.00% by weight. Such preparation may be carried out in a manner known per se to the person skilled in the art.

The process is preferably carried out in a rotary cement kiln. Several types of rotary kilns may be used, e.g. a wet process kiln, a long dry process kiln, a semi-wet process kiln, a semi-dry process kiln, a preheater cement kiln, or a precalciner cement kiln. An added benefit of the use of mineralisers in the preparation of the Portland cement clinker in the composition of the invention is a reduction of the emission of nitrogen oxides compared with the preparation of clinker with a similar high $C_3S$ content, but without the use of mineralisers.

The fluorine-containing mineraliser components used in the raw material may be selected from fluorspar, fluorite as well as various fluorine-containing industrial byproducts. The sulfur-containing mineraliser may be selected from calcium sulfate, calcium sulfite, or hydrates thereof, pyrite or any other suitable sulfur-containing natural or industrial raw material. Sulfate may also be introduced into the kiln as part of the fuel (e.g. by using sulfur-containing fuel).

The carbonate-containing extender may be added at the cement plant before milling, during milling or after milling of the Portland cement clinker component described above. The carbonate-containing extender may also be mixed with cement based on the clinker described above, said mixing taking place outside the cement plant, for example at a construction site, or the carbonate-containing extender and the cement may be added separately when mixing the intended paste, mortar or concrete. In such cases, the extender may be added as a dry powder or as a slurry, either separately or premixed with other constituents such as filler, sand, aggregate, other extenders such as fly ash, silica fume or blast furnace slag, blending water, or various chemical additives.

In view of the above, the invention further concerns a composition comprising an extended cement composition as described above as well as one or more further components selected from any of the commonly used or well known cement paste, mortar or concrete additives or mixing materials used in cement technology. In this connection, reference is made to standard works in the field such as "Betonbogen", 2. Ed., 1985, Aalborg Portland, and Christian F. Justesen, "Tilsaetningsstoffer til Beton", Beton-teknik, 1/07/1983, Aalborg Portland.

Typical, but not limiting, examples of such additives are cement extenders (other than those already specified above for components (b)), fillers, aggregate, plasticizing and superplasticizing agents, accelerators, concrete retarders, air entraining agents, defoaming agents, freezing point decreasing agents, adhesiveness improving agents, water repellants or waterproofing agents, expansion-promoting agents, corrosion inhibiting agents, radiation shielding agents, thickeners, as well as water for hydration.

As non-limiting examples of extenders may be mentioned silica fume, calcined clay, natural pozzolan (e.g. volcanic ash, moler or diatomite), artificial pozzolan (e.g. fly ash, calcined moler, calcined diatomite or calcined clay), iron blast furnace slag, alumino-silicate, amorphous silica, rock flour, alumina, fluorspar, or mixtures thereof. As mentioned above, the particle size of an extender is typically of the same order as that of the cement clinker in the composition which the extender is to be added to.

Non-limiting examples of aggregate are sand, gravel, crushed stone, crushed rock (such as granite, gneiss, limestone, dolomite, marble, shale, slate, or schist), blast furnace slag, combustion slag, heavyweight aggregate (such as barytes, magnetite, limonite, ilmenite, iron or steel), lightweight aggregate (such as expanded clay, sintered clay, shale, slate, diatomaceous slate, perlite, vermiculite, slag, natural pumice, scoria, volcanic cinders, tuff, diatomite, sintered fly ash, or industrial cinders), or mixtures thereof.

Typical but non-limiting examples of plasticizing agents are polyhydroxycarboxylic acids or salts thereof, lignosulfonates, polyethylene glycols, or mixtures thereof.

The superplasticising agent may typically be selected from alkaline or earth alkaline metal salts of lignin sulfonates; alkaline or earth alkaline metal salts of highly condensed naphthalene sulfonic acid/formaldehyde condensates; alkaline or earth alkaline metal salts of melamine/formaldehyde/sulfite condensates; sulfonic acid esters; carbohydrate esters; or mixtures thereof.

The accelerator may typically be selected from soluble chloride salts (such as calcium chloride), triethanolamine, paraformaldehyde, soluble formate salts (such as calcium formate), sodium hydroxide, potassium hydroxide, sodium carbonate, sodium sulfate, $12CaO \cdot 7Al_2O_3$, sodium sulfate, and mixtures thereof.

Typical examples of the retarder are lignosulfonates, hydroxycarboxylic acids (such as gluconic acid, citric acid, or salicylic acid), sugars, phosphates, borates, silico-fluorides, calcium bromate, calcium sulfate, sodium sulfate, and mixtures thereof.

As non-limiting examples of the air-entraining agent may be mentioned vinsol resins, sodium abietate, fatty acids and salts thereof, tensides, alkyl-aryl-sulfonates, phenol ethoxylates, lignosulfonates, and mixtures thereof.

Typical defoaming agents may be selected from silicones (such as dimethylpolysiloxane), alkyl phosphates (such as tributyl phosphate), and mixtures thereof.

In the composition, the freezing point decreasing agent is typically selected from ethyl alcohol, calcium chloride, potassium chloride, and mixtures thereof. The adhesiveness-improving agent may typically be selected from polyvinyl acetate, styrene-butadiene, acrylics, and mixtures thereof.

The water-repellent or water-proofing agent may be selected from fatty acids (such as stearic acid or oleic acid), lower alkyl fatty acid esters (such as butyl stearate), fatty acid salts (such as calcium or aluminium stearate), silicones, wax emulsions, hydrocarbon resins, bitumen, and mixtures thereof.

Examples of expansion-promoting agents are aluminium powder, zinc powder, iron powder, calcium sulfoaluminate, and mixtures thereof. Corrosion-inhibiting agents may be selected from sodium nitrite, sodium sulfite, sodium chromate, and mixtures thereof. A radiation-shielding agent may be a boron compound, and a thickener may be a polyethylene oxide.

Water/cement (W/C) ratios may be from 0.15 (for ultra-dense materials such as those using high amounts of silica fume filler, e.g. materials of the DENSIT® type) up to 1.20, normally from 0.4 to 1.0, calculated on the extended cement.

The invention is further illustrated by the following non-limiting examples.

In the examples, chemical analysis and grain size distribution measurements of the cements were done by standard methods. Mineralogical compositions were calculated from the chemical analysis by use of the Bogue formulas corrected to allow for the presence of $CaSO_4$ in the cement (F. M. Lea: "The Chemistry of Cement and Concrete". Edward Arnold (Publishers) Ltd., London, p. 115–116).

Setting time and standard consistency were determined according to the European Standard EN 196-3, and the fineness (Blaine specific surface area) according to EN 196-6. The compressive strengths were measured according to either the Danish Standard DS 427 or EN 196-1. The only difference between these two standards resides in the method of compacting the mortar during casting, and the results obtained are equivalent.

Characterization of the materials used in the examples are given in the tables below.

Table 1 shows the data of the base cements used. All cements were produced from clinker burned in production cements kilns. Gypsum was, in some cases, added to the mill during cement grinding. The approximate quantity gypsum added to the mill is indicated in Table 1. The reference conventional Portland cements "X" and "Y" were produced from conventional Portland cement clinker. Cement "X" was manufactured by grinding the clinker in a laboratory cement mill equipped with a high efficiency separator. Cement "Y" was a commercially available conventional Portland cement (Aalborg Portland's RAPID CEMENT®).

The data of the extenders used in the experiments are found in Table 2.

The cement kiln electrostatic precipitator dusts "K", "L", and "M" were obtained from a semi-wet process precalcining cement kiln. The dust was extracted by the electrostatic precipitator from the kiln flue gas after passing a drier crusher and a de-dusting cyclone. Electrostatic precipitator dusts "K" and "L" were obtained while the kiln was producing conventional Portland clinker, whereas dust "M" was obtained while the Kiln was producing mineralised clinker, hence the raised content of $SO_3$ and F. The cement kiln electrostatic precipitator dust "R" was extracted from the flue gases from a wet process cement kiln.

The fine chalk "N" is a commercial product (AlPINE FIN® from Dankalk, Denmark) produced by air classifying crushed chalk. The material has a grain size distribution similar to that of the electrostatic precipitator dust.

Coarse limestone "O" is a commercially available ground Danish limestone (GRENA PODERKALK®, from Faxe Kalk, Denmark), whereas coarse limestone "P" is a laboratory ground English limestone.

Fly ash "Q" (from a Danish coal-fired power station), the high-activity ground granulated blast furnace slag "S" (from Civil & Marine Slag, UK), and alumina "T" (CT-2000SG, from Alcoa, Germany) are all commercial products.

Throughout the examples both absolute and relative compressive strength of the extended cements tested are stated. The relative strengths are obtained by dividing the absolute compressive strength of the extended cement with the compressive strength of the matching base cement.

EXAMPLE 1

Mineralised cement "A" was produced by adding gypsum and fluorspar to the raw mix, burning the mixture in a production cement kiln, and grinding the clinker in a production cement mill circuit equipped with a high efficiency separator. No gypsum was added to the mill.

As a reference, conventional Portland cement "X" was used.

Ca. 5 kg batches of blended cements were prepared by mixing the base cement with various amounts of cement kiln electrostatic precipitator dust "K" (median grain size: 2.5 µm), fine chalk "N" (median grain size: 2.1 µm), or coarse limestone "O" (median grain size: 9.6 µm), respectively. Mixing was carried out by stirring the materials in a plastic container filled with rubber balls, using a shaking apparatus.

The results of the investigation are shown in Table 3.

The example illustrates the high 1-day strength which may be obtained by combining the carbonate-containing extender with a mineralised cement with a high silica ratio (S.R.=7.0). The highest strengths are reached when cement kiln electrostatic precipitator dust "K" is used as the extender. The strength-contributing effect of the extender with the high-S.R. cement is apparently higher after 1 day than after 7 or 28 days.

EXAMPLE 2

Mineralised cement "B" was produced by adding gypsum and fluorspar to the raw mix, burning the mixture in a production cement kiln, and grinding the clinker in a laboratory cement mill equipped with a high efficiency separator.

Ca. 0.9% by weight $SO_3$ was added as gypsum to the mill in order to reach the specified cement $SO_3$-content of 3.5% by weight.

As a reference, conventional Portland cement "X" was used.

Ca. 5 kg batches of blended cements were prepared by mixing the base cement with various amounts of cement kiln electrostatic precipitator dust "L" (median grain size: 2.4 µm), coarse limestone "P" (median grain size: 12.0 µm), fly ash "Q", or blast furnace slag "S", respectively. Mixing was carried out by stirring the materials in a plastic container filled with rubber balls, using a shaking apparatus.

The results of the investigation are shown in Tables 4, 5a and 5b.

The tables compare a high-S.R. mineralised cement ("B", S.R.=6.6) with a conventional cement ("X") as base for extended cements. The enhanced strength contribution of cement kiln electrostatic precipitator dust "L" or coarse limestone "P", and the high strengths obtainable in combination with mineralised cement "B" is illustrated in Table 4.

The effect is more pronounced for the fine-grain electrostatic precipitator dust "L" than for the coarse limestone "P" and is most significant at the earliest ages. After 28 days, the strength contribution of the carbonate-based extenders are similar regardless of cement type.

Table 5a illustrates that the relative strength contributions of fly ash "Q" or blast furnace slag "S" are fairly independent of the cement type. The strength contributions of fly ash and blast furnace slag are lower than those of the carbonate-based extenders combined with mineralised cement after 1 and 7 days. The strength contributions of fly ash are similar to those of the carbonate-based extenders combined with mineralised cement after 28 days.

Combinations of cement kiln electrostatic precipitator dust "L" with fly ash "Q" or blast furnace slag "S", respectively (Table 5b), results in strength contributions intermediate between the results shown in Tables 4 and 5a.

EXAMPLE 3

Mineralised cement "C" was produced by adding gypsum and fluorspar to the raw mix, burning the mixture in a production cement kiln, and grinding the clinker in a production cement mill circuit. No gypsum was added to the mill.

Ca. 40 kg batches of blended cements were prepared by mixing the base cement with various amounts of cement kiln electrostatic precipitator dust "M" (median grain size: 2.6 µm). Mixing was carried out by agitating the materials in a rotating, rubber ball-containing steel drum.

The results of the investigation are shown in Table 6. It is notable that the strength contribution of cement kiln electrostatic precipitator dust "M" is significantly enhanced after not only 1 day (cf. Examples 1 and 2), but also after 7 and 28 days when added to a mineralised cement ("C") with a fairly low S.R. (2.8).

EXAMPLE 4

Mineralised cement "D" was produced by adding gypsum and fluorspar to the raw mix, burning the mixture in a production cement kiln, and grinding the clinker in a production cement mill circuit equipped with a high efficiency separator. No gypsum was added to the mill.

Base cements were mixed with various amounts of cement kiln electrostatic precipitator dust "M" (median grain size: 2.6 m). Cement kiln electrostatic precipitator dust "R" (median grain size: 12.2 µm, $Na_2O_{eq}$: 11.8% by weight) was added to some blends and hemihydrate to others. The hemihydrate was prepared by heating gypsum at 110° C. for two days. Mixing was for some blends (85–70% by weight mineralised cement) carried out according to the method described in Example 3, whilst the method described in Example 1 was used for the rest. Cross checking showed that the mixing method did not influence the results obtained.

As a reference, conventional Portland cement "Y" was used.

The results of the investigation are shown in Table 7. The enhanced strength-contributing effect of cement kiln electrostatic precipitator dust to both 1, 7 and 28 day strength when used in combination with a low-S.R. mineralised cement ("D", S R.=2.6), and the surprisingly high strength at high amounts of added extender are clearly seen. Further 1-day strength increases were achieved by adding alkali (as cement kiln electrostatic precipitator dust "R") or sulfate (as hemihydrate) to the extended cement.

EXAMPLE 5

Mineralised cements "E" and "F" were produced by adding gypsum and fluorspar to the raw mix, and burning the mixture in a production cement kiln. Cement "E" was ground in a production cement mill circuit equipped with a high efficiency separator whereas cement "F" was ground in a production mill circuit without a high efficiency separator. No gypsum was added to the mill.

Ca. 5 kg batches of blended cements were prepared by mixing the base cement with various amounts of fine alumina "T" (median grain size: 1.1 µm). Mixing was carried out by stirring the materials in a plastic container filled with rubber balls, using a shaking apparatus.

As a reference, conventional Portland cement "Y" was used.

These experiments were conducted in order to investigate whether fine-grain alumina might perform similarly to the fine carbonate-based extenders. The results (Table 8) show that this is not the case.

EXAMPLE 6

Mineralised cement "F" was produced as described in Example 5. Mineralised cement "G" was produced by adding fluorspar to the raw mix, burning the mixture in a production cement kiln, and grinding the clinker in a laboratory ball mill. 4% by weight of gypsum was added to the cement during grinding.

Ca. 5 kg batches of blended cements were prepared by mixing the base cement with various amounts of cement kiln electrostatic precipitator dust "M" (median grain size: 2.6 µm). Mixing was carried out by stirring the materials in a plastic container filled with rubber balls, using a shaking apparatus.

The results of the investigation are shown in Table 9. This example illustrates the effect of fine carbonate-based extender when used in combination with a mineralised cement of low LSF (Cement "F", LS=0.95) or with a mineralised cement which was produced by adding gypsum to the mill instead of to the kiln (cement "G"). It will be seen (Table 9) that the strength contribution of cement kiln electrostatic precipitator dust is significantly higher when added to these cements than when added to conventional Portland cement (see Table 7).

EXAMPLE 7

Mineralised cements were produced by adding gypsum and fluorspar to the raw mix, burning the mixture in a production cement kiln, and grinding the clinker in a production cement mill circuit equipped with a high efficiency separator. No gypsum was added to the mill.

Blended cement "1" was produced by mixing cement kiln electrostatic precipitator dust "M" (median grain size: 2.6 µm) and mineralised cement "H" in the same manner as described in Example 3. Blended cements "2" and "3" were manufactured during a production trial, where cement kiln electrostatic precipitator dust similar to "M" was added to a mineralised cement similar to "E" in the high efficiency separator of a production mill circuit.

The blended cements were used to manufacture concretes. As reference, concretes were produced with the conventional Portland cement "Y".

Concrete recipes and mortar and concrete results are found in Table 10. The results show that extended cements with a performance similar to that of laboratory-mixed cements may be produced on a large-scale installation. The example also shows that high concrete strengths may be attained by use of the extended cements. Comparison with strengths of concretes made with conventional Portland cement indicates that the use of the extended cement containing 15% by weight of cement kiln electrostatic precipitator dust may make significant cement savings possible in concrete.

TABLE 1a

Base cement properties - 1

| Cement type | Mineralised cement | | | | |
|---|---|---|---|---|---|
| Designation | "A" | "B" | "C" | "D" | "E" |
| Approx. quantity gypsum added to mil (% w/w) | 0.0 | 0.0 | 0.0 | 0.0 | 0.0 |
| Chemical Composition (% w/w) | | | | | |
| $SiO_2$ | 22.5 | 21.9 | 20.1 | 19.9 | 19.7 |
| $Al_2O_3$ | 2.35 | 2.3 | 4.63 | 5.18 | 5.32 |
| $Fe_2O_3$ | 0.87 | 1.0 | 2.65 | 2.58 | 2.85 |
| CaO | 69.1 | 68.5 | 67.1 | 66.3 | 66.9 |
| MgO | 0.58 | 0.6 | 0.73 | 0.75 | 0.74 |
| $SO_3$ | 2.70 | 3.48 | 2.55 | 2.28 | 2.50 |
| F | 0.26 | 0.28 | 0.27 | 0.26 | 0.26 |
| LOI | 0.80 | 0.9 | 0.85 | 0.49 | 0.46 |
| $K_2O$ | 0.37 | 0.33 | 0.46 | 0.62 | 0.58 |
| $Na_2O$ | 0.23 | 0.20 | 0.24 | 0.27 | 0.24 |
| $Na_2O_{eq}$ | 0.47 | 0.42 | 0.54 | 0.68 | 0.62 |
| Free lime | 1.38 | 1.26 | 1.76 | 2.49 | 1.59 |
| Ratios (w/w) | | | | | |
| L.S.F. | 1.01 | 1.02 | 1.03 | 1.02 | 1.03 |
| A/F | 2.7 | 2.3 | 1.8 | 2.0 | 1.9 |
| S.R. | 7.0 | 6.6 | 2.8 | 2.6 | 2.4 |
| Bogue mineralogical composition (% w/w) | | | | | |
| $C_3S$ | 79.9 | 80.5 | 71.3 | 63.7 | 69.6 |
| $C_2S$ | 4.2 | 2.1 | 3.7 | 9.0 | 3.9 |
| $C_3A$ | 4.8 | 4.4 | 7.8 | 9.4 | 9.3 |
| $C_4AF$ | 2.5 | 3.0 | 8.1 | 7.9 | 8.7 |
| Density (kg/m³) | 3145 | 3114 | 3124 | 3152 | |
| Median grain size, $d_{50}$ (µm) | 15.0 | 13.8 | 11.8 | 14.0 | 10.4 |
| Specific surface area (m²/kg) | 388 | 375 | 400 | 389 | 396 |
| Normal consistency (% w/w) | 26.0 | 30.2 | 28.0 | 28.4 | 29.4 |
| Initial Set (h:min) | 2:20 | 3:45 | 1:15 | 2:00 | 2:20 |
| Final set (h:min) | 3:00 | 4:30 | 1:40 | 2:25 | 3:10 |

TABLE 1a-continued

Base cement properties - 1

| Cement type | Mineralised cement | | | | |
|---|---|---|---|---|---|
| Designation | "A" | "B" | "C" | "D" | "E" |
| Compressive strength (MPa) | | | | | |
| 1 day | 27.0 | 22.7 | 23.8 | 21.6 | 24.6 |
| 7 days | 56.5 | 62.0 | 57.8 | 56.0 | 57.6 |
| 28 days | 69.2 | 77.4 | 66.9 | 63.3 | 66.6 |

TABLE 1b

Base cement properties - 2

| | Cement | | | | |
|---|---|---|---|---|---|
| | Mineralised cement | | | Conventional Portland cement | |
| Designation | "F" | "G" | "H" | "X" | "Y" |
| Approx. quantity $SO_3$ added as gypsum to mill (% w/w) | 0.0 | 1.6[a] | 0.0 | 3.0[a] | 2.5[a] |
| Chemical Composition (% w/w) | | | | | |
| $SiO_2$ | 20.7 | 19.9 | 20.0 | 20.4 | 21.3 |
| $Al_2O_3$ | 5.64 | 5.32 | 4.76 | 4.7 | 4.76 |
| $Fe_2O_3$ | 3.30 | 3.09 | 2.71 | 3.0 | 2.85 |
| CaO | 65.5 | 66.2 | 67.0 | 64.4 | 64.3 |
| MgO | 0.77 | 0.74 | 0.75 | 0.8 | 0.75 |
| $SO_3$ | 2.48 | 2.22 | 2.65 | 3.5 | 3.10 |
| F | 0.26 | 0.29 | 0.29 | 0.04 | 0.05 |
| LOI | 0.17 | 1.07 | 0.36 | 1.30 | 1.37 |
| $K_2O$ | 0.61 | 0.53 | 0.45 | 0.53 | 0.53 |
| $Na_2O$ | 0.25 | 0.23 | 0.24 | 0.24 | 0.25 |
| $Na_2O_{eq}$ | 0.65 | 0.58 | 0.54 | 0.59 | 0.60 |
| Free lime | 0.57 | 1.54 | 1.62 | 1.1 | 1.54 |
| Ratios (w/w) | | | | | |
| L.S.F. | 0.95 | 1.01 | 1.03 | 0.96 | 0.93 |
| A/F | 1.7 | 1.7 | 1.8 | 1.6 | 1.7 |
| S.R. | 2.3 | 2.4 | 2.7 | 2.6 | 2.8 |
| Bogue mineralogical composition (% w/w) | | | | | |
| $C_3S$ | 57.1 | 65.7 | 70.6 | 55.8 | 48.7 |
| $C_2S$ | 16.4 | 7.4 | 4.2 | 16.4 | 24.4 |
| $C_3A$ | 9.4 | 8.9 | 9.0 | 7.7 | 7.8 |
| $C_4AF$ | 10.0 | 9.4 | 8.3 | 9.2 | 8.7 |
| Density (kg/m³) | 3247 | 3197 | 3120 | 3151 | 3118 |
| Median grain size, $d_{50}$ (µm) | 16.8 | 12.8 | 11.5 | 13.2 | 14.2 |
| Specific surface area (m²/kg) | 318 | 408 | 363 | 391 | 399 |
| Normal consistency (% w/w) | 25.3 | 26.4 | 29.7 | 28.6 | 28.0 |
| Initial Set (h:min) | 2:40 | 1:45 | 2:05 | 2:30 | 1:50 |
| Final set (h:min) | 3:35 | 2:25 | 2:40 | 3:00 | 2:15 |
| Compressive strength (MPa) | | | | | |
| 1 day | 9.8 | 16.5 | 22.6 | 19.7 | 22.0 |
| 7 days | 46.6 | 55.7 | 61.1 | 55.2 | 48.2 |
| 28 days | 66.0 | 62.4 | 70.9 | 62.7 | 63.3 |

[a]No gypsum added to the kiln, clinker $SO_3$ content approx. 0.5–0.6% w/w

TABLE 2

Composition of extenders

| Designation | Cement kiln electrostatic precipitator dust "K" | "L" | "M" | "R" | Fine chalk "N" |
|---|---|---|---|---|---|
| Chemical Composition (% w/w) | | | | | |
| $SiO_2$ | 10.9 | 10.7 | 11.4 | 10.6 | 4.46 |
| $TiO_2$ | 0.19 | 0.13 | | 0.06 | |
| $Al_2O_3$ | 2.62 | 2.25 | 2.71 | 0.97 | 0.70 |
| $Fe_2O_3$ | 1.74 | 1.52 | 1.18 | 0.36 | 0.22 |
| CaO | 46.2 | 47.2 | 47.1 | 30.4 | 52.0 |
| MgO | 0.46 | 0.42 | 0.46 | 0.29 | 0.33 |
| $SO_3$ | 0.64 | 0.40 | 1.21 | 20.3 | 0.15 |
| F | 0.04 | 0.04 | 0.12 | | 0.05 |
| LOI | 35.6 | 35.8 | 34.3 | 19.0 | 41.7 |
| $K_2O$ | 0.78 | 0.68 | 0.45 | 12.6 | 0.11 |
| $Na_2O$ | 0.22 | 0.21 | 0.20 | 3.52 | 0.04 |
| $Na_2O_{eq}$ | 0.73 | 0.66 | 0.49 | 11.8 | 0.11 |
| Cl | 0.31 | 0.03 | 0.26 | | 0.00 |
| Free lime | 0.13 | 1.23 | 2.02 | | |
| Density (kg/m³) | 2703 | 2706 | 2701 | 2664 | 2779 |
| Median grain size, $d_{50}$ (μm) | 2.5 | 2.4 | 2.6 | 12.2 | 2.2 |
| Specific surface area (m²/kg) | 1171 | 1199 | 1228 | 849 | 1421 |

| Designation | Coarse limestone "O" | Coarse limestone "P" | Fly ash "Q" | Blast furnace slag "S" | Fine alumina "T" |
|---|---|---|---|---|---|
| Chemical Composition (% w/w) | | | | | |
| $SiO_2$ | 3.70 | 1.52 | 56.2 | 33.9 | 0.15 |
| $TiO_2$ | | 0.04 | 0.99 | 0.48 | |
| $Al_2O_3$ | 0.22 | 0.07 | 21.5 | 11.2 | >99.6 |
| $Fe_2O_3$ | 0.12 | 0.10 | 9.91 | 1.3 | 0.03 |
| CaO | 52.7 | 54.7 | 3.15 | 41.9 | 0.02 |
| MgO | 0.70 | 0.26 | 1.73 | 9.2 | 0.1 |
| $SO_3$ | 0.08 | 0.00 | 0.54 | 0.1 | |
| F | | 0.06 | | | |
| LOI | 42.2 | 43.1 | 2.80 | 0.4 | <0.5 |
| $K_2O$ | 0.05 | 0.01 | 2.16 | 0.29 | |
| $Na_2O$ | 0.03 | 0.03 | 0.80 | 0.30 | 0.1 |
| $Na_2O_{eq}$ | 0.06 | 0.05 | 2.22 | 0.49 | |
| Cl | 0.00 | | | 0.01 | |
| Free lime | | | | | |
| Density (kg/m³) | 2733 | 2682 | 2277 | 2950 | 3980 |
| Median grain size, $d_{50}$ (μm) | 12.0 | 9.6 | 19.0 | 11.0 | 1.1 |
| Specific surface area (m²/kg) | 509 | 521 | 255 | 426 | |

<sup>a</sup>Manufacturer's data

TABLE 3

Mineralised or conventional Portland cement combined with various limestone-based extenders

| Composition (% w/w) | | | |
|---|---|---|---|
| Mineralised cement "A" | 90 | 90 | 90 |
| Cem. kiln el. precipitator dust "K" | 10 | | |
| Fine chalk "N" | | 10 | |
| Coarse limestone "O" | | | 10 |
| Normal consistency (% w/w) | 26.2 | 26.2 | 26.6 |
| Initial set (h:min) | 3:10 | 3:05 | 3:15 |
| Final set (h:min) | 3:30 | 3:40 | 3:40 |
| Compressive strength absolute (MPa)/ relative (%), | | | |
| 1 day | 30.4/113 | 28.3/105 | 24.3/90 |
| 7 days | 55.7/99 | 53.8/95 | 49.3/87 |
| 28 days | 67.0/97 | 65.6/95 | 59.6/86 |

| Composition (% w/w) | | | |
|---|---|---|---|
| Mineralised cement "A" | 77 | 77 | 77 |
| Cem. kiln el. precipitator dust "K" | 23 | | |
| Fine chalk "N" | | 23 | |
| Coarse limestone "O" | | | 23 |
| Normal consistency (% w/w) | 27.2 | 27.0 | 26.0 |
| Initial set (h:min) | 2:05 | 2:35 | 2:45 |
| Final set (h:min) | 2:30 | 3:00 | 3:10 |
| Compressive strength absolute (MPa)/ relative (%), | | | |
| 1 day | 28.9/107 | 26.1/97 | 21.5/80 |
| 7 days | 52.9/94 | 49.4/87 | 42.8/76 |
| 28 days | 57.3/83 | 54.3/78 | 52.9/76 |

| Composition (% w/w) | | | | |
|---|---|---|---|---|
| Mineralised cement "A" | 65 | 65 | | 65 |
| Conventional Portland cement "X" | | | 65 | |
| Cem. kiln el. precipitator dust "K" | 35 | | | |
| Fine chalk "N" | | 35 | 35 | |
| Coarse limestone "O" | | | | 35 |
| Normal consistency (% w/w) | 28.5 | 29.0 | 31.0 | 27.4 |
| Initial set (h:min) | 1:55 | 2:10 | 1:55 | 2:00 |
| Final set (h:min) | 2:45 | 2:25 | 2:50 | 2:40 |
| Compressive strength absolute (MPa)/ relative (%), | | | | |
| 1 day | 24.7/91 | 21.3/79 | 13.4/68 | 17.1/63 |
| 7 days | 46.4/82 | 41.9/74 | 34.7/63 | 37.1/66 |
| 28 days | 51.9/75 | 44.3/64 | 43.5/69 | 41.9/61 |

TABLE 4

Mineralised or conventional Portland cement combined with various limestone-based extenders

| Composition (% w/w) | | | | |
|---|---|---|---|---|
| Mineralised cement "B" | 85 | | 85 | |
| Conventional Portland cement "X" | | 85 | | 85 |
| Cem. kiln el. precipitator dust "L" | 15 | 15 | | |
| Coarse limestone "P" | | | 15 | 15 |
| Normal consistency (% w/w) | 30.2 | 29.0 | 29.6 | 29.0 |
| Initial set (h:min) | 3:05 | 2:30 | 2:10 | 2:15 |
| Final set (h:min) | 3:35 | 2:50 | 2:45 | 2:35 |
| Compressive strength absolute (MPa)/ relative (%), | | | | |
| 1 day | 28.4/125 | 18.8/95 | 24.0/106 | 16.3/83 |
| 7 days | 60.3/97 | 50.6/91 | 59.0/95 | 46.9/85 |
| 28 days | 69.1/89 | 62.1/99 | 69.8/90 | 57.2/91 |

| Composition (% w/w) | | | |
|---|---|---|---|
| Mineralised cement "B" | 75 | | 75 |
| Conventional Portland | | 75 | | 75 |

TABLE 4-continued

Mineralised or conventional Portland cement combined with various limestone-based extenders

| cement "X" | | | | |
|---|---|---|---|---|
| Cem. kiln el. precipitator dust "L" | 25 | 25 | | |
| Coarse limestone "P" | | | 25 | 25 |
| Normal consistency (% w/w) | 31.0 | 30.2 | 28.0 | 27.2 |
| Initial set (h:min) | 3:05 | 2:10 | 2:45 | 2:00 |
| Final set (h:min) | 3:45 | 2:50 | 3:20 | 2:25 |
| Compressive strength absolute (MPa)/ relative (%), | | | | |
| 1 day | 26.4/116 | 17.5/89 | 23.0/101 | 12.9/65 |
| 7 days | 55.4/89 | 43.8/79 | 51.6/83 | 39.1/71 |
| 28 days | 62.2/80 | 53.6/85 | 60.2/78 | 48.8/78 |
| Composition (% w/w) | | | | |
| Mineralised cement "B" | 65 | | 65 | |
| Conventional Portland cement "X" | | 65 | | 65 |
| Cem. kiln el. precipitator dust "L" | 35 | 35 | | |
| Coarse limestone "P" | | | 35 | 35 |
| Normal consistency (% w/w) | 31.0 | 31.2 | 27.6 | 27.0 |
| Initial set (h:min) | 3:00 | 2:30 | 2:30 | 2:00 |
| Final set (h:min) | 3:40 | 3:15 | 3:05 | 2:30 |
| Compressive strength absolute (MPa)/ relative (%), | | | | |
| 1 day | 23.9/105 | 13.9/71 | 18.7/82 | 10.6/54 |
| 7 days | 46.5/75 | 36.1/65 | 42.6/69 | 32.1/58 |
| 28 days | 53.9/70 | 45.8/73 | 48.6/63 | 41.7/67 |

TABLE 5a

Minerlised or conventional Portland cement combined with fly ash or ground granulated blast furnace slag

| Composition (% w/w) | | | | |
|---|---|---|---|---|
| Mineralised cement "B" | 80 | | | |
| Conventional Portland cement "X" | | 80 | | |
| Fly ash "Q" | 20 | 20 | | |
| Normal consistency (% w/w) | 30.3 | 29.6 | | |
| Initial set (h:min) | 4:05 | 3:10 | | |
| Final set (h:min) | 4:50 | 4:40 | | |
| Compressive strength absolute (MPa)/ relative (%), | | | | |
| 1 day | | 17.2/76 | | 13.8/70 |
| 7 days | | 50.7/82 | | 39.5/72 |
| 28 days | | 66.0/85 | | 54.3/87 |
| Composition (% w/w) | | | | |
| Mineralised cement "B" | 70 | | 70 | |
| Conventional Portland cement "X" | | 70 | | 70 |
| Fly ash "Q" | 30 | 30 | | |
| Blast furnace slag "S" | | | 30 | 30 |
| Normal consistency (% w/w) | 29.1 | 28.0 | 31.2 | 29.2 |
| Initial set (h:min) | 4:10 | 3:10 | 4:00 | 2:50 |
| Final set (h:min) | 5:00 | 3:50 | 4:30 | 3:15 |

TABLE 5a-continued

Minerlised or conventional Portland cement combined with fly ash or ground granulated blast furnace slag

| Compressive strength absolute (MPa)/ relative (%), | | | | |
|---|---|---|---|---|
| 1 day | 13.8/61 | 11.7/59 | 15.8/70 | 11.5/58 |
| 7 days | 40.9/66 | 32.8/59 | 46.1/74 | 40.1/73 |
| 28 days | 54.3/70 | 44.4/71 | 66.3/106 | 61.5/98 |
| Composition (% w/w) | | | | |
| Mineralised cement "B" | 60 | | 60 | |
| Conventional Portland cement "X" | | 60 | | 60 |
| Fly ash "Q" | 40 | 40 | | |
| Blast furnace slag "S" | | | 40 | 40 |
| Normal consistency (% w/w) | 28.8 | 28.6 | 32.4 | 29.0 |
| Initial set (h:min) | 4:45 | 3:20 | 4:00 | 2:35 |
| Final set (h:min) | 5:45 | 4:15 | 4:35 | 3:00 |
| Compressive strength absolute (MPa)/ relative (%), | | | | |
| 1 day | 11.9/52 | 8.0/41 | 13.7/60 | 9.6/49 |
| 7 days | 33.8/55 | 24.5/44 | 42.2/68 | 37.2/60 |
| 28 days | 44.4/57 | 35.7/57 | 63.2/101 | 62.0/99 |

TABLE 5b

Mineralised or conventional Portland cement combined with cement kiln electrostatic precipitator dust and fly ash or ground granulated blast furnace slag

| Composition (% w/w) | | | | |
|---|---|---|---|---|
| Mineralised cement "B" | 65 | | 65 | |
| Conventional Portland cement "X" | | 65 | | 65 |
| Cem. kiln electrostatic precipitator dust "L" | 15 | 15 | 15 | 15 |
| Fly ash "Q" | 20 | 20 | | |
| Blast furnace slag "S" | | | 20 | 20 |
| Normal consistency (% w/w) | 29.2 | 28.2 | 30.0 | 31.0 |
| Initial set (h:min) | 3:30 | 2:50 | 3:05 | 2:50 |
| Final set (h:min) | 4:00 | 3:15 | 3:35 | 3:20 |
| Compressive strength absolute (MPa)/ relative (%), | | | | |
| 1 day | 18.4/81 | 11.4/58 | 20.7/91 | 12.3/62 |
| 7 days | 46.1/74 | 34.6/63 | 51.0/82 | 44.1/80 |
| 28 days | 51.6/67 | 45.8/73 | 67.1/87 | 58.4/93 |

TABLE 6

Mineralised or conventional Portland cement combined with cement kiln electrostatic precipitator dust

| Composition (% w/w) | | | | |
|---|---|---|---|---|
| Mineralised cement "C" | 95 | 90 | 85 | 70 |
| Cem. kiln el. precipitator dust "M" | 5 | 10 | 15 | 30 |
| Normal consistency (% w/w) | 27.7 | 27.9 | 28.2 | 30.2 |
| Initial set (h:min) | 1:15 | 1:25 | 1:20 | 1:30 |
| Final sat (h:min) | 2:00 | 1:50 | 1:50 | 2:00 |

TABLE 6-continued

Mineralised or conventional Portland cement combined with cement kiln electrostatic precipitator dust

| Compressive strength absolute (MPa)/ relative (%), | | | | |
|---|---|---|---|---|
| 1 day | 23.9/100 | 25.9/109 | 25.8/108 | 22.0/92 |
| 7 days | 60.3/104 | 60.3/104 | 58.5/101 | 50.1/87 |
| 28 days | 70.8/106 | 67.1/100 | 63.7/95 | 57.6/86 |

TABLE 7

Mineralised or conventional Portland cement combined with cement kiln electrostatic precipitator dust

| Composition (% w/w) | | | | |
|---|---|---|---|---|
| Mineralised cement "D" | 85 | 80 | | 75 |
| Conventional Portland cement "Y" | | | 80 | |
| Cem. kiln el. precipitator dust "M" | 15 | 20 | 20 | 25 |
| Compressive strength absolute (Mpa)/ relative (%), | | | | |
| 1 day | 24.0/111 | 24.2/112 | 19.1/87 | 24.0/111 |
| 7 days | 55.9/100 | 52.0/93 | 44.7/93 | 52.7/94 |
| 28 days | 64.6/102 | 64.6/102 | | 60.8/96 |

| Composition (% w/w) | | | | |
|---|---|---|---|---|
| Mineralised cement "D" | 70 | | 65 | 60 |
| Conventional Portland cement "Y" | | 70 | | |
| Cem. kiln el. precipitator dust "M" | 30 | 30 | 35 | 40 |
| Compressive strength absolute (MPa)/ relative (%), | | | | |
| 1 day | 22.2/103 | 16.2/74 | 21.6/100 | 19.3/89 |
| 7 days | 50.1/89 | | 45.9/82 | 42.0/75 |
| 28 days | 56.7/90 | | 51.3/81 | 49.1/78 |

| Composition (% w/w) | | | | |
|---|---|---|---|---|
| Mineralised cement "D" | 55 | 62 | 62 | 57 |
| Cem. kiln el. precipitator dust "M" | 45 | 35 | 35 | 40 |
| Cem. kiln el. precipitator dust "R" | | | 3 | 3 |
| Hemihydrate | | 3 | | |
| Compressive strength absolute (MPa)/ relative (%), | | | | |
| 1 day | 18.0/83 | 25.3/117 | 23.6/109 | 22.2/103 |
| 7 days | 36.9/66 | 44.7/80 | 42.3/76 | 37.9/68 |
| 28 days | 44.6/70 | 51.7/82 | 47.0/74 | 44.1/70 |

TABLE 8

Mineralised or conventional Portland cement combined with finely milled calcined alumina

| Composition (% w/w) | | | |
|---|---|---|---|
| Mineralised cement "E" | 80 | | |
| Mineralised cement "F" | | 80 | |
| Conventional Portland cement "Y" | | | 80 |
| Fine alumina "T" | 20 | 20 | 20 |
| Compressive strength absolute (MPa)/ relative (%), | | | |
| 1 day | 7.8/32 | 5.9/60 | 12.5/60 |
| 7 days | 36.0/63 | 33.0/71 | 37.4/78 |

TABLE 9

Mineralised or conventional Portland cement combined with cement kiln electrostatic precipitator dust

| Composition (% w/w) | | | | |
|---|---|---|---|---|
| Mineralised cement "F" | 85 | 80 | 75 | |
| Mineralised cement "G" | | | | 80 |
| Cem. kiln el. precipitator dust "M" | 15 | 20 | 25 | 20 |
| Normal Consistency (% w/w) | 26.4 | 26.7 | 27.2 | |
| Initial set (h/min) | 2:40 | 2:20 | 2:15 | |
| Final set (h/min) | 3:10 | 3:00 | 2:55 | |
| Compressive strength absolute (MPa)/ relative (%), | | | | |
| 1 day | 12.9/132 | 11.5/117 | 11.7/119 | 17.8/108 |
| 7 days | 46.7/100 | 45.5/98 | 42.8/92 | 54.7/98 |

TABLE 10

Mineralised cement combined with cement kiln electrostatic precipitator dust

| Concrete recipes (kg/m²) | "I" | "II" |
|---|---|---|
| Cement | 130 | 250 |
| Fly ash | 50 | |
| Silica fume | 14 | |
| Water | 154 | 150 |
| Sand | 845 | 820 |
| Aggregate 4–8 mm | 115 | 115 |
| Aggregate 8–16 mm | 1030 | 1030 |
| Plasticizer | 2 | 2 |

| Results Designation | "1" | "2" | "3" | Ref. |
|---|---|---|---|---|
| Composition (% w/w) | | | | |
| Mineralised cement similar to "E" | | 85 | 75 | |
| Mineralised cement "H" | 85 | | | |
| Conventional Portland cement "Y" | | | | 100 |
| Cem. kiln el. precipitator dust "M" | 15 | | | |
| Cem. kiln el. precipitator dust similar to "M" | | 15 | 25 | |
| Compressive strength (EN 196-1 mortar) absolute (MPa), | | | | |
| 1 day | 24.6 | 26.2 | 21.6 | 22.0 |
| 7 days | 54.4 | 55.1 | 51.3 | 48.2 |
| 28 days | 65.4 | 67.6 | 58.2 | 63.3 |

TABLE 10-continued

| Mineralised cement combined with cement kiln electrostatic precipitator dust | | | |
|---|---|---|---|
| Compressive strength (concrete "I") absolute (MPa), | | | |
| 1 day | 2.8 | 2.0 | 1.6 | 2.5 |
| 7 days | 13.3 | 13.3 | 10.9 | 8.9 |
| 28 days | 22.6 | 23.2 | 19.2 | 18.8 |
| Compressive strength (concrete "II") absolute (MPa), | | | |
| 1 day | 7.9 | 7.0 | 8.9 | 8.2 |
| 7 days | 31.4 | 34.5 | 27.7 | 24.4 |
| 28 days | 37.0 | 37.7 | 32.4 | 32.8 |

We claim:

1. A cement composition comprising
   a) from 50% to 97% by weight (calculated on the total composition) of a Portland cement clinker, having a sulfur content which is in the range of 0.5–10% by weight expressed as $SO_3$, and having a fluorine content which is in the range of 0.13–1.00% by weight expressed as $F^-$; and
   b) from 3% to 50% by weight (calculated on the total composition) of an extender containing a carbonate selected from the group consisting of calcium carbonate, magnesium carbonate, calcium magnesium carbonate and mixtures thereof, as its main constituent and having a median particle size ($d_{50}$) of below 14 μm.

2. A cement composition according to claim 1 wherein the median particle size $d_{50}$ of the extender is below 12 μm.

3. A cement composition according to claim 1 wherein the extender comprises carbonate-containing rocks, carbonate-containing minerals or carbonate-containing synthetic compounds.

4. A cement composition according to claim 1 wherein the extender has a content of a carbonate selected from the group consisting of calcium carbonate, magnesium carbonate, calcium magnesium carbonate and a mixture thereof wherein the content of the carbonate is at least 50% by weight.

5. A cement composition according to claim 1 wherein the content of Portland cement clinker and extender is 60–95% and 5–40% by weight, respectively.

6. A cement composition according to claim 1 wherein the Portland cement clinker contains $C_3S$ and $C_2S$ which are present in a total amount of at least 65% calculated according to Bogue.

7. A cement composition according to claim 1 wherein the Portland cement clinker has a sulfur content in the range of 1.3–10% by weight expressed as $SO_3$, and a fluorine content in the range of 0.13–0.55% by weight expressed as $F^-$.

8. A cement composition according to claim 1 wherein the Portland cement clinker has an alkali metal content expressed as $Na_2O$ equivalent in the range of 0.1–0.8% by weight.

9. A cement composition according to claim 1 wherein the sulfur content of the Portland cement clinker expressed as $SO_3$ is in the range of 1.5–6% by weight.

10. A cement composition according to claim 1 wherein the Portland cement clinker has a fluorine content, expressed as $F^-$, in the range of 0.15–0.45% by weight.

11. A cement composition according to claim 1 wherein the Portland cement clinker contains $C_3S$ in a crystalline form characterized by the presence in its x-ray diffractogram of only one peak in the region 51°–52° 2θ corresponding to the 220 reflection of its hexagonal subcell.

12. A cement composition according to claim 1 in which the Portland cement clinker comprises silicate crystal phases, and fluorine in the Portland cement clinker is predominantly present in solid solution in the silicate crystal phases.

13. A cement composition according to claim 1 in which the Portland cement clinker comprises silicate crystal phases, and the Portland cement clinker contains more than 0.6% by weight of aluminum in solid solution in the silicate crystal phases, expressed as $Al_2O_3$.

14. A cement composition according to claim 1 in which the Portland cement clinker has a lime saturation factor of at least 0.95.

15. A cement composition according to claim 1 wherein the Portland cement clinker has a silica ratio that is in the range of 2–30.

16. A cement composition according to claim 1 wherein the Portland cement clinker has a sulfur/fluorine ratio which, expressed as $SO_3/F$, of at least 6.6.

17. A cement composition according to claim 1 wherein the Portland cement clinker contains $C_3S$ in an amount of at least 60%.

18. A cement composition according to claim 1 wherein the Portland clinker contains aluminum in an amount, expressed as $Al_2O_3$, of less than 6% by weight.

19. A cement composition according to claim 1 wherein the Portland cement clinker contains free lime in an amount that is less than 3% by weight.

20. A cement composition according to claim 1 wherein the Portland cement clinker contains calcium langbeinite in an amount that is in the range of 0.1–8.3% by weight.

21. A cement composition according to claim 1 wherein the cement clinker is ground to a specific surface area of 200–900 $m^2$/kg.

22. A cementitious composition comprising cement composition according to claim 1 and a retarding agent.

23. A composition according to claim 22 wherein the retarding agent is calcium sulfate or a hydrate thereof.

24. A cement composition according to claim 1 wherein the extender has an alkali metal content of below 0.8% by weight expressed as $Na_2O$ equivalent.

25. A cement composition according to claim 1 which, when the cement clinker is ground to a specific surface area of 400 $m^2$/kg, exhibits a 1-day compressive strength of at least 21 MPa.

26. A composition comprising a cement composition according to claim 1 and one or more components comprising cement extenders other than calcium carbonate, magnesium carbonate, and calcium magnesium carbonate; aggregate, plasticizing and super-plasticizing agents, accelerators, concrete retarders, air entraining agents, defoaming agents, freezing point decreasing agents, adhesiveness improving agents, water repellents or waterproofing agents, expansion-promoting agents, corrosion inhibiting agents, radiation shielding agents, thickeners or water.

27. A composition according to claim 26 wherein the cement extender is selected from silica fume, calcined clay, natural pozzolan, artificial pozzolan, iron blast furnace slag, alumino-silicate, amorphous silica, rock flour, alumina, fluorspar, or mixtures thereof.

28. A composition according to claim 26 wherein the aggregate comprises sand, gravel, crushed stone, crushed rock, blast furnace slag, combustion slag, barytes, magnetite, limonite, ilmenite, iron, steel, lightweight aggregate, or mixtures thereof.

29. A cement composition according to claim 3, wherein the extender comprises calcite, aragonite, dolomite, limestone, dolostone, dolomitic limestone, travertine, calcarenite, coquina, chalk, marble, carbonate-containing industrial products, carbonate-containing industrial by-products, carbonate-containing industrial wastes or carbonate-containing electrostatic-precipitator dust.

30. A cement composition according to claim 1, wherein the extender is dust extracted by electrostatic precipitation from cement kiln exhaust gases.

* * * * *